Jan. 8, 1952     D. R. CORSON ET AL     2,582,190
SAW TOOTH VOLTAGE GENERATOR
Filed July 6, 1945
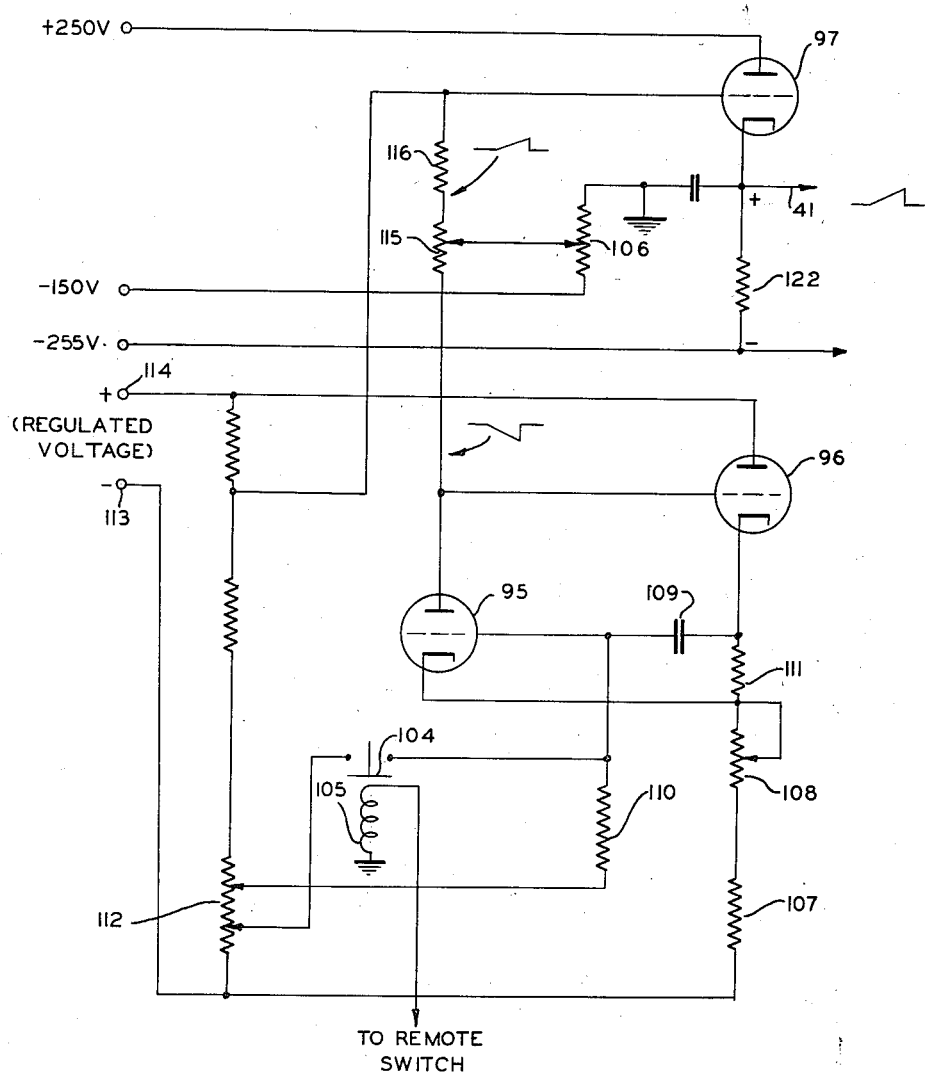
INVENTORS
DALE R. CORSON
WALTER G. PREE
BY
ATTORNEY Patented Jan. 8, 1952

2,582,190

UNITED STATES PATENT OFFICE 2,582,190

SAW-TOOTH VOLTAGE GENERATOR

Dale R. Corson, Sandoval County, N. Mex., and Walter G. Pree, Westchester County, N. Y., assignors, by mesne assignments, to the United States of America as represented by the Secretary of the Navy Application July 6, 1945, Serial No. 603,426

11 Claims. (Cl. 250—36)

This invention relates to electronic apparatus for generating voltages that change in a linear manner over a period of time, commonly known as saw-tooth voltage waves, and particularly to apparatus for generating saw-tooth waves having a long period, in the order of minutes.

In a prior application, S. N. 538,852, filed May 16, 1944, the illustrative apparatus herein described is disclosed (Fig. 5) and discussed to some extent, and a valuable use for a long period saw-tooth voltage wave is there set forth.

An object of this invention is to provide an electronic long-period saw-tooth voltage wave generator that will furnish a wave having linear variation in voltage throughout its entire range.

Another object is to provide in such a generator a means for varying and controlling the linearity of the saw-tooth voltage wave.

A further object is to provide an electronic long-period saw-tooth voltage wave generator that will be light in weight, inexpensive and easy to manufacture, and will require the use of only one vacuum tube.

A still further object is to provide an electronic long-period saw-tooth wave generator that can be started, stopped, and re-started as desired.

Other and further objects will appear during the course of the following description.

Although linear saw-tooth voltage waves having a period of many minutes may be produced by a linear potentiometer provided with an adjustable constant voltage thereacross, and a constant-speed motor arranged to move the movable contact of the potentiometer gradually so as to produce a long-period change in voltage, a vacuum tube device that will accomplish the same object has the advantages of saving weight, avoiding contact troubles, and obtaining greater linearity, at low cost. It is accordingly another object of our invention to provide an electronic saw-tooth voltage wave generator that will have these advantages.

In known electronic long-period saw-tooth voltage wave generators a resistor charging-condenser combination is used in conjunction with a constant-current pentode vacuum tube, the charging condenser being connected from the plate to the control grid of the vacuum tube, and the resistor from the same control grid to a source of voltage, sometimes the negative grid biasing voltage, and at other times to the plate voltage, as desired. The condenser is charged to a high value during the generation of the saw-tooth wave. A single pentode used in this manner furnishes a long-period saw-tooth wave that is linear in voltage change but not perfectly so. Some voltage compensation of the resistor member of the resistor-condenser combination is required to keep the condenser charging current as nearly constant as possible, and is obtained by the use of a triode vacuum tube. Thus, two vacuum tubes are used, one of which is a pentode. Attempts to use a triode vacuum tube in the same circuit as the pentode, that is, with the charging condenser connected from plate to grid, results in poor linearity of the saw-tooth wave.

In accordance with the teachings of our invention, it is possible to use a triode vacuum tube as a long-period linear saw-tooth voltage wave generator. The charging condenser is discharged very slowly over a small voltage range during the generation of the saw-tooth wave, controlling the potential of the grid of the triode vacuum tube as it does so. A second triode vacuum tube, the elements of which may be in the same envelope as those of the first, is in a cathode follower circuit, and is interposed between the charging condenser and the anode of the first tube, its cathode being connected to one side of the charging condenser, and its grid to the anode of the first tube, thus keeping high potentials from the condenser. Cathode biasing resistors common to both tubes aid in regulating the voltage on one plate of the condenser and control the linearity of its discharge. A very large resistor is introduced in the discharge path of the condenser, on the side nearest the grid of the first tube, slowing down the discharge of the condenser and regulating the voltage on its other plate. In regulating the voltage on the plate of the condenser to which it is connected, the cathode follower circuit and tube also contribute to the slowing down of the discharge of the condenser. We therefore have an electronic device comprising in combination, a vacuum tube circuit for generating saw-tooth voltage waves, means for controlling the output of this circuit, and a second vacuum tube circuit having impedances associated therewith, and impedances associated with the first circuit and with the controlling means for regulating the action of the controlling means, so that the output of the saw-tooth voltage wave generating circuit is substantially linear and has a long period. This is accomplished as explained wth reference to the drawing showing an electrical circuit diagram of an electronic apparatus embodying our invention.

Two triode vacuum tubes, 95 and 96 are used, of which tube 95 generates a saw-tooth voltage wave when the apparatus is placed in operation, and tube 96, in a cathode follower circuit, operates to regulate the linearity of the wave, as will be explained. Condenser 109 is the charging-condenser, and may be large, about 4 microfarads. When the system is placed in operation, condenser 109 is discharged through resistors 110, part of 112, 107, 108, and 111. Resistor 110 is chosen to be much larger than the others, and may be 2 megohms, with the result that it plays the greatest part in controlling the time constant of the discharge. Resistors 107 and 108 are small, and may have values of 1500 and 500 ohms respectively, while resistor 111 may have a value of 50,000 ohms. Obviously, triodes 95 and 96 may be in one envelope, such as a double-triode. It is desirable that a substantially constant voltage be applied to the anodes of tubes 95 and 96, as a regulated voltage at terminals 113 and 114. Also, it is desirable for reasons to be set forth below, that the negative side of this regulated voltage, 113, be not grounded.

In the inoperative state, contacts 104 of relay 105 are closed and resistor 110 is shunted out of the circuit. A substantially negative voltage is placed on the grid of tube 95 and on the left-hand plate of condenser 109. This voltage is so chosen that vacuum tube 95 does not conduct. Simultaneously, a substantially positive voltage is placed on the grid of tube 96, this being the same voltage as is found on the anode of tube 95. As a consequence, tube 96 is in a current-conducting state, and current is flowing through resistors 111, 108, and 107 to terminal 113. Thus, there is cathode biasing of the cathodes of tubes 95 and 96, the cathode of tube 95 being somewhat less positive than the cathode of tube 96 because resistor 111 is in the cathode circuit of tube 96 only, while resistors 107 and 108 are in the cathode circuits of both tubes. Resistor 111 is so chosen that the cathode of tube 96 will be substantially positive with respect to the grid of tube 95, and this difference can be regulated at resistor 112. The right-hand plate of condenser 109 is then charged more positively than the left-hand plate while switch 104 is closed.

Operation is started by opening switch 104. This may be done manually, or remotely through relay 105. When switch 104 is opened, the shunt is removed from resistor 110 and a more positive voltage is applied to the grid of tube 95 through resistor 110. This change of voltage on the grid of tube 95 could be furnished by electronic means, such as a multivibrator or other square-wave generator, and the relay switch arrangement shown is intended to be merely illustrative, and not limiting. A more positive voltage now being available to the grid of tube 95 and the left-hand plate of condenser 109, this plate and grid begin to rise to the new voltage, being limited in speed by resistor 110. Thus, condenser 109 begin to discharge through resistors 110, part of 112, 107, 108, and 111, and will contintue to do so until the left-hand plate has reached the same potential as the right-hand plate, which is the equilibrium voltage for the cathode of tube 96. Resistor 110 and condenser 109 being large, as aforementioned, this process will of itself take a long time, but is further slowed as will be explained. As the left-hand plate of condenser 109 rises in voltage, tube 95 gradually begins to conduct. This causes the voltage at the anode of tube 95 to decrease, due to the resultant Ohm's law voltage drop in resistors 115 and 116, simultaneously reducing the grid voltage for tube 96 and decreasing the current of that tube. As a result, the amount of current in resistors 107, 108, and 111 coming from tube 96 decreases, and the voltage on the cathode of tube 96 drops toward the voltage of the grid of tube 95. This process takes place very slowly, however, because it is partially compensated by an increase of current in resistors 107 and 108, due to the fact that tube 95 is now conducting, and the Ohm's law voltage drop in resistors 107 and part of 108 tends to raise the voltage of the cathode of tube 95, and consequently tends to raise the voltage of the right-hand plate of condenser 109. Since resistor 111 is large with respect to resistors 107 and 108, and in the cathode circuit of tube 96 only, the drop in voltage of the cathode of tube 96 as that tube conducts less and less is greater than the rising tendency of the voltage of the cathode of tube 95 as that tube conducts more and more, so that the voltage on the right-hand plate of condenser 109 falls very slowly toward the value of the voltage on the left-hand plate of the same condenser. At the same time, there is a net drop in the voltage of the cathode of tube 95, since this cathode is tied to the cathode of tube 96 and the right-hand plate of condenser 109 through resistor 111. The movable contact of potentiometer 108 may be adjusted so that rate of current discharge of condenser 109 is substantially constant. This will result in a substantially constant voltage drop across resistor 110, and consequently in a substantially constant voltage on the grid of tube 95 and on the left-hand plate of condenser 109. Further, the voltage on the right-hand plate of condenser 109 will fall at a substantially uniform rate, this being required by the facts of the substantially constant current discharge of condenser 109 and the substantially constant potential on the left-hand plate of that condenser. The drop in voltage of the cathode of tube 95 is thus substantially uniform in rate, or linear. Thus, since the voltage on the grid of tube 95 is substantially constant, and the voltage on the cathode of tube 95 is dropping substantially linearly, the conductivitly of tube 95 will increase in a substantially linear fashion. Therefore, output of tube 95, taken off at the anode of that tube, across resistors 115 and 116, will be a voltage that changes in a substantially linear fashion. Thus, the circuit may be adjusted to provide a high degree of linearity in the output, and it will be seen that the provision of the resistors 107 and 108 is an important feature of this type of generator of long-period linear voltage change. It is to be noted that the variable resistor 108 may be used to provide a slight non-linearity in either direction if desired.

The circuit just described is quite different from circuits in which a condenser is suddenly caused to charge or to discharge towards a fixed value of voltage. The value of voltage towards which condenser 109 tends to discharge is in this case substantially uniformly changed as the discharge proceeds. The total time required to reach the final condition thus achieved by keeping the rate of change of this voltage relatively low over the whole process is very much greater than if the final voltage conditions were immediately established and only the time constant of the resistor-condenser circuit were involved for controlling the rate at which the grid of tube 95 reaches the equilibrium potential.

In general, the time required for reaching equilibrium conditions after switch 104 is opened is approximately equal to the product of the amplification factor of tube 95 and the time constant of the resistor-condenser circuit 109×110, resistors 107, 108, 111 and part of 112 being insignificantly small. This relation is only approximate because of the fact that the amplification factor of tube 95 varies somewhat with the current in the tube, but it furnishes a useful basis for roughly predicting the behavior of a circuit of this sort. It will be seen that the change in the anode voltage of tube 95 will be approximately mu times the change in the grid voltage in tube 95 when tube 95 begins to conduct, mu being the amplification factor of the tube. Since tube 96 adjusts its cathode potential at a value substantially equal to that of the grid of tube 96, the change in voltage of the cathode of tube 96 is also approximately mu times the change in the voltage between the grid and cathode of tube 95. Thus the voltage across resistor 110 is substantially limited to $$\frac{1}{mu}$$

times the voltage across resistor 111. This limits the current in resistor 110 to $$\frac{1}{mu}$$

times the current that would flow therein without the limitation thus provided, thus substantially multiplying by mu the time required to dissipate a given amount of charge in condenser 109 through resistor 110. When a tube having an amplification factor of about 70 is provided as tube 95, the effective time-constant of the circuit may be of the order of nine minutes.

The provision of the cathode follower tube 96 in the circuit just described has the advantage of providing isolation between the anode circuit of tube 95 and the discharge circuit of condenser 109. Thus, although the voltage on the righthand plate of condenser 109 is about the same as that of the anode of tube 95, the fact that the current for resistor 111 does not pass through resistors 115 and 116 but is provided substantially without reaction on the anode circuit of tube 95 is advantageous and improves the operation of the device.

As previously pointed out, the change of voltage produced in resistors 115 and 116, which is the output voltage of the circuit, is substantially linear in character. The amplitude of the change of voltage, which is to say the rate of the output voltage, may be adjusted by adjusting the variable contact of potentiometer 115. The voltage level at which the said change of voltage takes place may be adjusted by adjusting the variable contacts of potentiometer 106. This arrangement of potentiometers has the advantage that the saw-tooth voltage wave provided may be started at a chosen voltage level and used at a chosen rate of voltage change.

The output of the linear voltage change is provided for use by other circuits through the cathode follower stage which includes tube 97. Because the circuits of tubes 95 and 96 are not grounded except through potentiometer 106, the gradual decrease in voltage of the anode of tube 95, relative to the voltage of the anode supply and the accompanying increase in current through resistors 115 and 116 will cause a gradual rise in the potential of the grid of tube 97.

This will increase the current passed by tube 97 and raise the voltage of the cathode, which voltage is transmitted to the using circuit by wire 41. Tube 97 and its associated electrical parts and wiring are not necessary to, or part of our invention, but are merely added to show a simple way to transfer the generated saw-tooth wave to another circuit for use without loading the generating circuit, the cathode follower circuit being one way to do this.

After switch 104 has remained open for a sufficiently long time, a new equilibrium is set up with tube 95 conducting and tube 96 non-conducting, and in order to initiate another sawtooth wave, the switch must be closed and then opened again. Upon the closing of switch 104, the normal condition of the circuit, in which condenser 109 is charged, is rapidly reestablished because the high resistance 110 is shunted out of the charging circuit of condenser 109. Only a few tenths of a second are necessary. The circuit is then ready for another saw-tooth wave. Re-setting of the circuit can be performed at any time during a saw-tooth wave merely by closing switch 104 for a few tenths of a second, and then reopening it. Thus, with this circuit, it is possible to start, stop, and re-start a sawtooth voltage wave as desired.

The within described circuit is intended to be illustrative of our invention, and is not the sole manner in which it can be practiced. Where sizes of circuit elements have been mentioned, they are by way of example only, and as will occur to those skilled in the art, the principles of our invention may be practiced in numerous additional ways. The scope of our invention is defined in the following claims:

We claim:

1. An electronic system comprising in combination, a first electron tube circuit for generating saw-tooth voltage waves, a second electron tube circuit arranged as a cathode follower, each of said electron tubes having at least a control grid, an anode, and a cathode, a condenser connected at one side to the grid of said first electron tube and at the other side to the cathode of said second electron tube, said second electron tube being connected at its grid to the anode of said first electron tube, a source of regulated anode voltage for both electron tubes, the anode of said second electron tube being connected directly to said source and the anode of said first electron tube being connected through an anode resistor to said source, a bleeder resistor across said source, a relatively large grid resistor connected at one side to the grid of said first electron tube and at the other side adjustably to said bleeder resistor near the negative end thereof, a first cathode resistor connected at one end to said cathode of said second electron tube and at the other end to the cathode of said first electron tube, a potentimeter as a second cathode resistor connected at one end to the cathode of said first electron tube and at the other end to the negative end of said bleeder resistor, the movable arm of said potentiometer being connected to said cathode of said first electron tube, whereby the cathode biasing voltage of said electron tubes may be varied, and the linearity of the discharge of said condenser regulated, said condenser discharging through said grid resistor, a portion of said bleeder resistor, a portion of said potentiometer, and said first cathode resistor, said condenser controlling the output of said first electron tube during said discharge, and a switch connected at one end to said grid of said first electron tube and at the other end adjustably to said bleeder resistor at a point of higher negative voltage than said grid resistor, whereby said grid resistor may be shunted out of said system completely to permit charging of said condenser or replaced in said system to permit said condenser to discharge therethrough.

2. A circuit comprising first and second electron tubes each having an anode, a cathode and a control grid, a condenser connected between the grid of said first tube and the cathode of said second tube, means connecting the grid of said second tube to the anode of said first tube, a source of anode voltage for both said electron tubes, the anode of said second tube being connected directly to said source and the anode of said first tube being connected through an anode resistor to said voltage source, a bleeder resistor connected across said voltage source, a relatively large grid resistor connected at one end to the grid of said first tube and at the other end adjustably to said bleeder resistor, a first cathode resistor connected between the cathodes of said first and second tubes, a second cathode resistor connected at one end to the cathode of said first tube and at the other end to the negative end of said bleeder resistor, said condenser discharging through said grid resistor, a portion of said bleeder resistor, said second cathode resistor and said first cathode resistor, said condenser controlling the output of said first electron tube during discharge, and switching means connected between the grid of said first tube and a point on said bleeder resistor which is more negative than the point of connection of said grid resistor, whereby said grid resistor may be shunted out of circuit to permit charging of said condenser or replaced in circuit to permit said condenser to discharge therethrough.

3. A circuit for producing a long time constant sweep voltage comprising, first and second electron tubes each having an anode, a cathode and a control grid, a first cathode resistor connected between the cathode of said first and second tubes, a second cathode resistance for connecting the cathode of said first tube to the negative terminal of a source of potential, means directly connecting the anode of said first tube and the control grid of said second tube, a condenser connected between the control grid of said first tube and the cathode of said second tube, means directly connecting the anode of said second tube to said source of potential, means including a resistance for connecting the anode of said first tube to said source of potential, a bleeder resistor connected across said source of potential, means including a relatively large resistor for connecting the grid of said first tube to a point on said bleeder resistor near the negative end thereof, and switching means for connecting the grid of said first tube to a point on said bleeder resistor which is more negative than the point of connection of the grid of said first tube, whereby said relatively large resistor may be shunted out of said system to permit charging of said condenser or replaced in said system to permit said condenser to discharge therethrough.

4. A circuit for producing a long time constant sweep voltage comprising, first and second electron tubes each having an anode, a cathode and a control grid, a first cathode resistor connected between the cathodes of said first and second tubes, a source of potential, a potentiometer connected as a second cathode resistor between the cathode of said first tube and the negative terminal of said source of potential, said potentiometer being arranged to vary the cathode biasing voltage of said tubes, means directly connecting the anode of said first tube and the control grid of said second tube, a condenser connected between the control grid of said first tube and the cathode of said second tube, means connecting the anodes of said first and second tubes to the positive terminal of said source of potential, a grid resistor, means for connecting said grid resistor between the grid of said first tube and the negative terminal of said source of potential, switching means shunting said grid resistor being arranged to permit charging of said condenser when closed and to permit said condenser to discharge through said grid resistor when open.

5. A circuit for producing a long time constant sweep voltage comprising, first and second electron tubes each having an anode, a cathode and a control grid, means directly connecting the anode of said first tube and the control grid of said second tube, a condenser connected between the grid of said first tube and the cathode of said second tube, a source of potential, a bleeder resistor connected across said source of potential, a cathode resistance connected between the cathode of said first and second tubes, a relatively large grid resistor connected between the grid of said first tube and a point on said bleeder resistor near the negative end thereof, means for charging said condenser and a variable resistance connected between the cathode of said first tube and the negative terminal of said source of potential.

6. A circuit for producing a long time constant sweep voltage comprising, first and second electron tubes each having an anode, a cathode and a control grid, means directly connecting the anode of said first tube and the control grid of said second tube, a condenser connected between the control grid of said first tube and the cathode of said second tube, a cathode resistance connected between the cathodes of said first and second tubes, means for charging said condenser, and a discharge path for said condenser comprising a relatively high resistance connected between the grid of said first tube and the junction of said cathode resistance with the cathode of said first tube.

7. A circuit for producing a long time constant sweep voltage comprising, first and second electron tubes each having an anode, a cathode and a control grid, a condenser connected between the grid of said first tube and the cathode of said second tube, means directly connecting the anode of said first tube and the grid of said second tube, a cathode resistance connected between the cathode of said first and second tubes, means for charging said condenser, said condenser upon discharge producing said sweep voltage, and a discharge path for said condenser including a relatively high resistance connected between the grid of said first tube and the cathode of said first tube, said condenser upon discharge through said discharge path producing a gradual change in the grid voltage of said first tube thereby producing a gradual change in anode current and anode voltage of said first tube, said second tube being operative in response to said change in anode voltage of said first tube to supply a potential to said condenser which prolongs the discharge of said condenser through said high resistance.

8. A circuit for producing a long time constant sweep voltage comprising first and second electron tubes each having an anode, a cathode and a control grid, a condenser connected between the grid of said first tube and the cathode of said second tube, a cathode resistance connected between the cathode of said first and second tubes, a series resistance network including a grid resistor of relatively high value connected between the grid of said first tube and the cathode of said first tube, means for charging said condenser, said condenser upon discharge through said grid resistor producing a gradual change in the grid voltage of said first tube thereby producing a gradual change in the anode current and voltage of said first tube, and means coupling the anode of said first tube to the control grid of said second tube, said second tube being connected as a cathode follower as aforesaid supplying a potential to said condenser in response to the gradual change in its grid voltage to prolong the time of discharge of said condenser through said grid resistance.

9. A circuit for producing a long time constant sweep voltage comprising, first and second electron tubes each having an anode, a cathode and a control grid, a first cathode resistance connected between the cathodes of said first and second tubes, a second cathode resistance for connecting the cathode of said first tube to the negative terminal of a source of potential, means including a resistance for connecting the anode of said first tube to the positive terminal of said source of potential, means directly connecting the anode of said second tube to the positive terminal of said source of potential, a condenser coupled between the grid of said first tube and the cathode of said second tube, a discharge path for said condenser including a high resistance connected in series with said second cathode resistance between the grid and cathode of said first tube, means for charging said condenser, said condenser upon discharge producing a gradual change in the grid voltage of said first tube and a simultaneous greater change in voltage at the anode thereof proportional to the amplification factor of said first tube, and means coupling the anode of said first tube to the control grid of said second tube, said second tube being connected as a cathode follower as aforesaid supplying a potential to said condenser in response to the change in its grid voltage to prolong the time of discharge of said condenser through said high resistance.

10. A circuit comprising first and second electron tubes each having an anode, a cathode and a control grid, said second tube being connected as a cathode follower, a condenser connected between the control grid of said first tube and the cathode of said second tube, means directly connecting the anode of said first tube and the control grid of said second tube, means for charging said condenser, and a discharge path for said condenser including a grid resistance connected between the grid of said first tube and the cathode circuits of said first and second tubes, said condenser upon discharge producing a gradual change in the grid voltage of said first tube and a simultaneous greater change in voltage at the anode of said first tube proportional to the amplification factor of said first tube, said cathode follower in response to the simultaneous change of voltage at its control grid supplying a potential to said condenser to prolong the time of discharge of said condenser through said discharge path.

11. A circuit comprising first and second electron tubes each having an anode, a cathode and a control grid, said second tube being connected as a cathode follower having a cathode resistance connected between its cathode and the cathode of said first tube, a condenser connected between the grid of said first tube and the cathode of said second tube, means for charging said condenser, a discharge path for said condenser including a relatively large resistance and a potentiometer serially connected between the grid of said first tube and the cathode of said first tube, said condenser upon discharging producing a gradual change in the grid voltage of said first tube and a simultaneous greater change in voltage at the anode thereof, and means directly coupling the anode of said first tube to the control grid of said second tube whereby said cathode follower in response to the change of voltage at its grid supplies a potential to said condenser to prolong the time of discharge thereof, said potentiometer being arranged to adjust the cathode biasing voltage of said first and second tubes thereby regulating the linearity of discharge of said condenser.

DALE R. CORSON.
WALTER G. PREE.

REFERENCES CITED

The following references are of record in the file of this patent:

UNITED STATES PATENTS

| Number | Name | Date |
| --- | --- | --- |
| 2,185,363 | White | Jan. 2, 1940 |
| 2,241,256 | Gould | May 6, 1941 |
| 2,350,069 | Schrader et al. | May 30, 1944 |
| 2,412,063 | Rosentreter | Dec. 3, 1946 |